United States Patent [19]

Mitchell

[11] Patent Number: 4,641,254

[45] Date of Patent: Feb. 3, 1987

[54] TEST SET FOR A NAVIGATIONAL SATELLITE RECEIVER

[75] Inventor: Donald L. Mitchell, Ellicott City, Md.

[73] Assignee: The United States of America as represented by the Secretary of the Navy, Washington, D.C.

[21] Appl. No.: 620,658

[22] Filed: Jun. 14, 1984

[51] Int. Cl.[4] .................... G01R 31/28; G06F 11/22
[52] U.S. Cl. ................................. 364/580; 364/551; 371/20; 371/25
[58] Field of Search ................ 364/551, 580; 371/20, 371/25

[56] References Cited

U.S. PATENT DOCUMENTS

| | | | |
|---|---|---|---|
| 3,845,484 | 10/1974 | Sawicki et al. | 340/825.36 |
| 3,977,001 | 8/1976 | Bishop | 343/17.7 |
| 4,168,796 | 9/1979 | Fulks et al. | 371/20 |
| 4,216,539 | 8/1980 | Raymond et al. | 371/20 |
| 4,287,594 | 9/1981 | Shirasaka | 371/25 |
| 4,314,234 | 2/1982 | Darrow et al. | 340/825.36 |
| 4,441,074 | 4/1984 | Bockett-Pugh et al. | 371/25 X |
| 4,503,536 | 3/1985 | Panzer | 371/25 |

FOREIGN PATENT DOCUMENTS 2531230 2/1984 France ................... 371/20

Primary Examiner—Felix D. Gruber
Attorney, Agent, or Firm—Kenneth E. Walden; John G. Wynn

[57] ABSTRACT

A test set including a digital card tester section and a satellite simulator section is used to detect the reduced capabilities of an associated navigational satellite receiver and to isolate malfunctions therein. The digital card tester section is configured to generate digital signals (signatures) which are used to test and isolate faults in four digital system boards (cards) of the associated navigational satellite receiver. The satellite simulator section is configured to generate a facsimile of a navigational reference signal which is normally transmitted by an associated satellite system and received by the aforementioned associated navigational satellite receiver. The facsimile signal is used to test the receiver-processor section of the associated navigational satellite receiver.

9 Claims, 4 Drawing Figures

TEST SET FOR A NAVIGATIONAL SATELLITE RECEIVER

CROSS-REFERENCE TO RELATED APPLICATION

The present application contains subject matter which is related to the subject matter disclosed in U.S. patent application Ser. No. 620,659, to R. E. Bateman, entitled, "A Test Set For A Navigational Satellite Receiver", filed June 14, 1984, and assigned to the same assignee as the present application.

BACKGROUND OF THE INVENTION

1. Field of the Invention

The present invention generally relates to a test set for determining the operational status of an associated navigational satellite receiver, but more specifically, the present invention relates to a test set having the dual capability of isolating faults in a digital section of the associated navigational satellite receiver and generating a facsimile of a navigational satellite reference signal for isolating faults in a receiver-processor section of the aforementioned associated navigational satellite receiver.

2. Description of the Prior Art

The AN/SRN-19(V)2 is an automatic shipboard radio navigational set that provides a continuous display of the position of the ship upon which it is associated. The ship's position, which is normally obtained by dead reckoning on the ship's true speed and heading, is periodically updated by fixes on a plurality of satellites. These satellites are part of the Navy Navigational Satellite System (NNSS), which is a world wide, all weather navigational system consisting of, inter alia, five satellites in polar orbits. The AN/SRN-19(V)2 shipboard radio navigational set, aforementioned, operates on a dedicated navigational program or algorithm which enables navigators to obtain accurate fixes using the data received from one of the five orbiting satellites.

Each satellite orbits the earth in approximately 107 minutes and continually transmits the following phase modulated data every two minutes on two radio frequency (RF) carriers: (1) time synchronization signals, (2) a 400 MHz signal, and (3) fixed and variable parameters describing the satellite's orbit. It should be mentioned that the foregoing satellite system is also used by commercial concerns.

The AN/SRN-19(V)2 radio navigational set comprises, inter alia, an antenna, an RF amplifier and a receiver-processor including a receiver portion and a data processor portion. The receiver portion extracts, amplifies and formats message information from the RF signal transmitted by the satellite and measures the doppler shift of this same signal. The reconstructed doppler shift of the satellite signal results from a relative motion between the receiver and the satellite. The message data obtained by the phase modulation of the RF carrier describes the satellite's position at an even two minute universal time period. The data processor processes inputs from the receiver, the ship's electromagnetic log and gyrocompass through two synchro-to-digital (S/D) converters and a receiver-processor keyboard. The data processor then performs computations and provides the desired outputs to a front panel display, a readout indicator, a printer and a cassette recorder.

It has been determined over a period of years that users of the NNSS were having problems determining whether the receiving equipment, for example, the AN/SRN-19(V)2, for obtaining their position was operating correctly, whether the receiving equipment was within the calibration range required for certification thereof, and, indeed, at times at sea (where references as to the ship's position were not available), whether the receiving equipment was operational.

Consequently, there is a need in the prior art for the capability of certifying satellite navigational receivers for operational readiness, and to facilitate and enable the end users to determine if there is, in fact, a failure and what the failed part is. Thus, the logistics could then be set-up so that instead of returning the particular navigational satellite receiver to a base depot for repair, the cognizant operator would be able to determine, in the field, what are the failed parts and request the particular replacement therefor.

The test set, according to the present invention, is configured to operate with the AN/SRN-19(V)2 radio navigational set, which is fully disclosed in the publication entitled, "Shipboard Operations and Maintenance Manual" (NAVELEX 0967-LP-634-9010).

OBJECTS OF THE INVENTION

Accordingly, an important object of the present invention is to configure a test set for operation with a predetermined associated navigational satellite receiver so as to certify the readiness thereof.

Another object of the present invention is to configure the test set so as to not only test the pertinent sections of the associated navigational satellite receiver, but, also, to be able to localize a failed part therein.

Yet another object of the present invention is to configure the test set to be portable and easy to interface with the predetermined associated navigational satellite receiver.

A further object of the present invention is to configure the test set so that it maintains its calibration over a long period of time and is easy to operate under field conditions.

Still a further object of the present invention is to configure the test set so as to generate a facsimile of the actual satellite signals so as to activate the "normal functions" of the predetermined associated navigational satellite receiver, so that the test set can be used as a training device (simulator) aboard ship when the ship is out of "view" of the Navy Navigational Satellite System (NNSS).

SUMMARY OF THE INVENTION

The test set, according to the present invention, by which the foregoing and other objects, features and advantages are accomplished is characterized, inter alia, by configuring it to comprise two independent test sections, which are a digital card tester section and a satellite simulator section.

The digital card tester section is used to test and isolate faults in four digital boards (cards) of an associated navigational satellite receiver, for example, the AN/SRN-19(V)2. A microprocessor portion of the digital card tester section is configured to generate a fixed pattern of test signals (signatures) with a predetermined response pattern. A fail indicator illuminates when any response deviation occurs. A pass indicator illuminates when a particular circuit board has successfully completed the test.

The satellite simulator section generates a satellite type radio frequency (RF) signal at a predetermined frequency for testing the receiver section of the aforementioned associated navigational satellite receiver, by signal insertion or radiation, in the absence of a system satellite. Various signal levels, degrees of phase modulation and signal frequencies are selectable by controls and switches associated with the satellite simulator section.

The aforementioned lights, controls and switches, inter alia, are disposed on and affixed to an escutcheon panel and a chassis combination, along with a common power supply. This configuration unifies the digital card test section and the satellite simulator section into a complete and portable test set.

BRIEF DESCRIPTION OF THE DRAWINGS

The foregoing and other objects and novel features and advantages of the present invention will be more apparent from the following more particular description of the preferred embodiments as illustrated in the accompaning drawings, in which.

DESCRIPTION OF THE PREFERRED EMBODIMENTS

The following is a description of the digital card tester section of a test set for a navigational satellite receiver, according to the present invention. A description of the satellite simulator section follows hereinafter.

Figure 1:
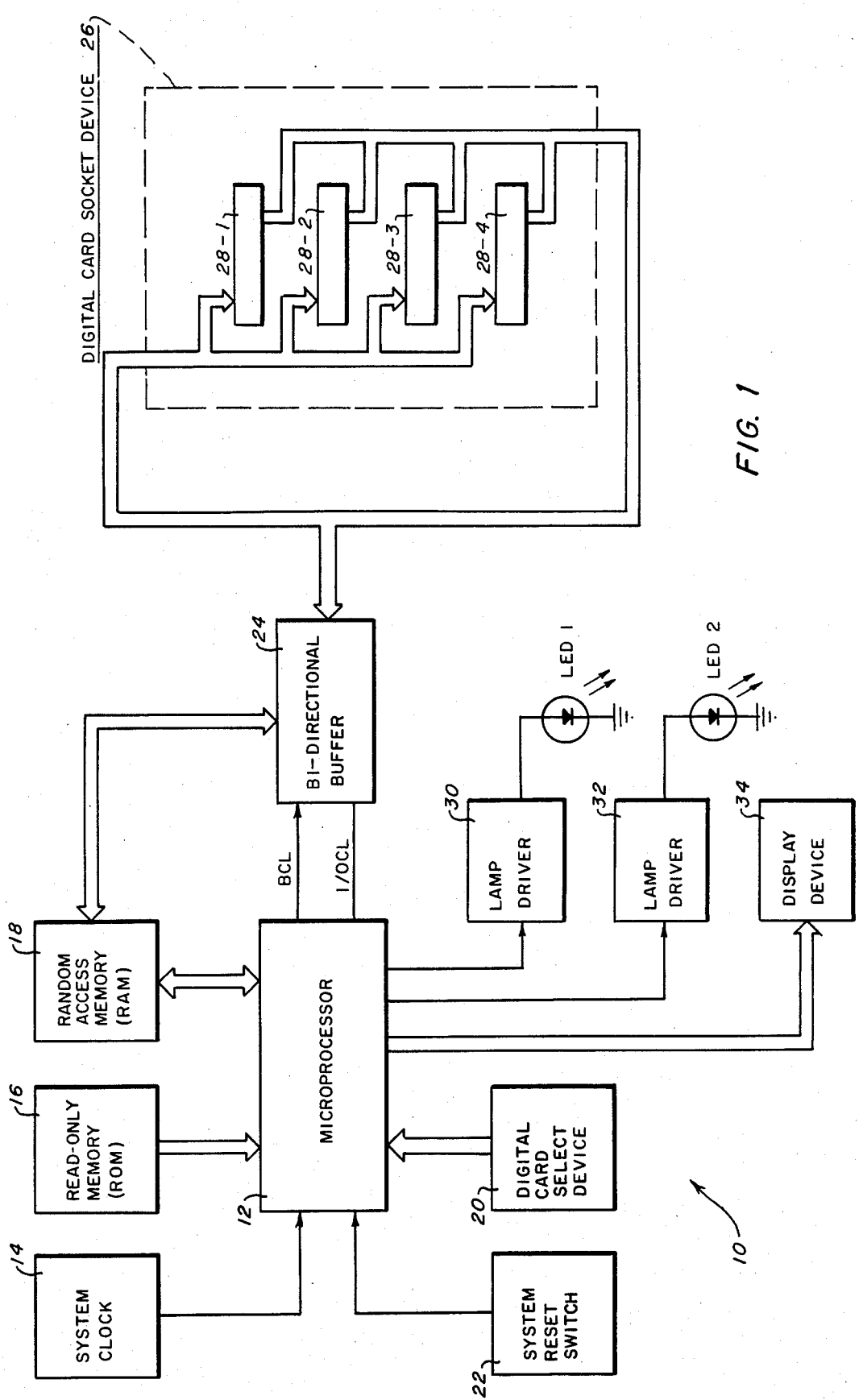
FIG. 1 is a block diagram representation of the digital card tester section of a test set for a navigational satellite receiver including, inter alia, a microprocessor portion and a read-only memory (ROM) portion, according to the present invention.

Referring then to FIG. 1, the digital card tester (DCT) section 10 comprises a microprocessor 12, a system clock 14, a read-only memory (ROM) 16 and a random access memory (RAM) 18. The DCT section 10 further comprises a digital card select device 20, a system reset switch 22, a bi-directional buffer 24, a digital card socket device 26 including a plurality of digital sockets 28-1, 28-2, 28-3 and 28-4, a lamp driver 30 having a corresponding pass indicator LED 1, a lamp driver 32 having a corresponding fail indicator LED 2 and a display device 34. For purposes of the present invention LED 1 and 2 are green and red light-emitting diodes, respectively.

Still referring to FIG. 1, the system clock 14 generates periodic signals used for synchronization and is operatively connected to the microprocessor 12. The ROM 16 and the RAM 18 are also operatively connected to the microprocessor 12. The microprocessor 12 is configured to execute the program stored in the ROM 16 and execute and interpret other instructions from the system reset switch 22 and the digital card select device 20. The microprocessor 12, via its bus control line (BCL) and its input/output control line (I/OCL), in cooperation with the bi-directional buffer 24, controls the flow of information to/from the RAM 18. The lamp driver 30 drives the pass indicator LED 1, and the lamp driver 30 drives the fail indicator LED 2, both being under the control of the microprocessor 12. In addition, the microprocessor 12 is operatively connected to the display device 34 for displaying the results of the test of a particular digital circuit board connected to a particular one of the digital sockets 28-1, 28-2, 28-3 or 28-4 of the digital card socket device 26. The operation of the DCT section 10 of FIG. 1 will be further described and explained hereinafter under the heading "Statement of the Operation."

Figure 2:
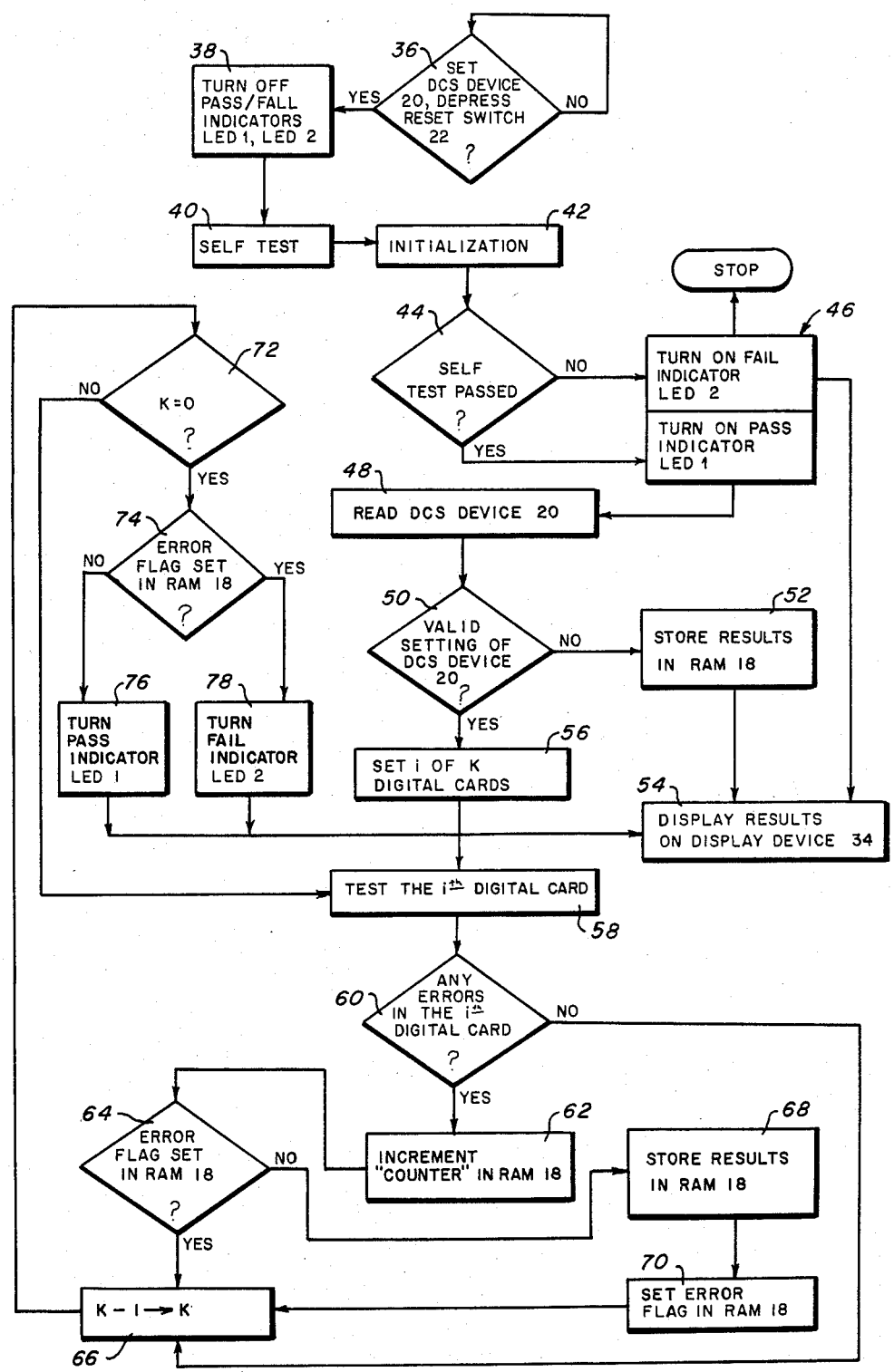
FIG. 2 is a specific pictorial flowchart illustrating the program stored in the ROM portion of FIG. 1 and the steps necessary for the proper operation of the microprocessor portion of FIG. 1 during the testing of one of the four digital system boards (cards) of the associated navigational satellite receiver.

FIG. 2, is a specific pictorial flowchart illustrating the program and steps necessary for the proper operation of the digital card tester section of FIG. 1 and will be used in the discussion of the operation thereof. The process blocks and the decision blocks in the aforementioned flowchart are designated with the numerals 36 through 78.

Following now is a brief description of the satellite simulator section of the test set for a navigational satellite receiver, according to the present invention.

Figure 3:
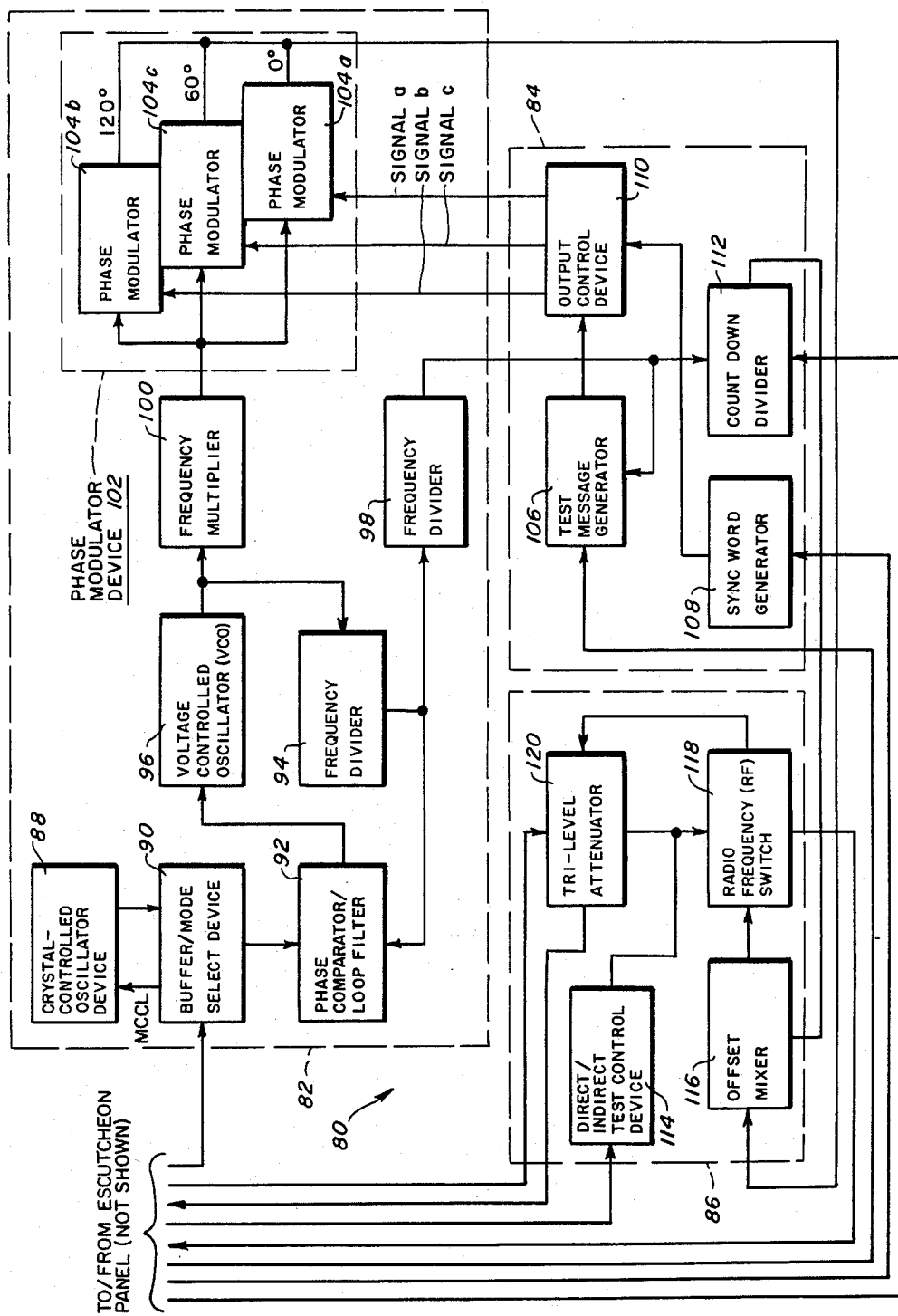
FIG. 3 is a block diagram representation of the satellite simulator section of the test set for a navigational satellite receiver, according to the present invention depicting, inter alia, a radio frequency portion and a digital portion thereof.

Referring then now to FIG. 3, the satellite simulator section 80 comprises a radio frequency portion 82, a digital portion 84 and an interface portion 86. The radio frequency portion 82 is configured to generate a crystal referenced approximately 400 MHz signal, which is $\pm 60$ degrees phase modulated. The digital portion 84 is configured to generate a sequence of digital data for driving the radio frequency portion 82. The interface portion 86 is configured to interface between the aforementioned radio frequency portion 82 and the associated navigational satellite receiver under test.

To continue, the radio frequency portion 82 comprises a crystal-controlled oscillator device 88 operatively connected to a buffer/mode select device 90 which is configured to automatically switch between the output of the aforementioned crystal-controlled oscillator device 88 and an external input signal from the associated navigational satellite receiver under test via an escutcheon panel (not shown). A phase coaparator/loop filter 92 is part of a phase-locked-loop (PLL) comprising a frequency divider 94 and a voltage controlled oscillator (VCO) 96. The output of the buffer/mode select device 90 drives the phase comparator/loop filter 92, which, in turn, drives the aforementioned VCO 96 whose output feeds the frequency divider 94. In turn, the frequency divider 94 feeds the aforementioned phase comparator/loop filter 92 thereby completing the phase-locked-loop feedback path. The frequency divider 94 also drives a frequency divider 98 whose output is operatively connected to the digital portion 84 of the satellite simulator section 80.

Still referring to FIG. 3, the radio frequency portion 82 further comprises a frequency multiplier 100 whose input is connected to the output of the VCO 96. The output of the frequency multiplier 100 is operatively connected to the input of a phase modulator device 102, which includes a phase modulator 104a, a phase modulator 104b and a phase modulator 104c each having phase delays of 0, 120 and 60 degrees, respectively. The phase modulator device 102 is also operatively connected to the digital portion 84. The output of the phase modulator device 102 is operatively connected to the interface portion 86 of the satellite simulator section 80.

The digital portion 84 of the satellite simulator section 80 comprises a test message generator 106, a sync word generator 108, an output control device 110 and a count down divider 112. The test message generator 106 and the sync word generator 108 are, both, operatively connected to the output control device 110 whose output signals a, b, and c drive the corresponding phase modulators 104a, 104b and 104c of the phase modulator 102. The input of the test message generator 106 and the input of the count down divider 112 are, both, driven by the frequency divider 98 of the radio frequency portion 82. The test message generator 106 and the sync word generator 108 are activated by switches (not shown) on the aforementioned escutcheon panel. Along with a common chassis and power supply (not shown), the aforementioned digital card tester section 10 of FIG. 1 and the satellite simulator section 80 of FIG. 2 are unified into a complete and portable test set.

To continue, the interface portion 86 comprises a direct/indirect test control device 114, an offset mixer 116, a radio frequency (RF) switch 118 and a tri-level attenuator 120. The input of the offset mixer 112 is driven by the output of the aforementioned phase modulator device 102. The output of the count down divider 112 of the digital portion 84 also is operatively connected to the offset mixer 116. The output of the mixer drives the RF switch 118 which directs the signal at its input either to the tri-level attenuator 120 or to the aforementioned escutcheon panel as directed by the direct/indirect test control device 114. The direct/indirect test control device 114 also is operatively connected to the tri-level attenuator 120. In addition, switches (not shown) on the aforementioned escutcheon panel operate to control the power level output of the tri-level attenuator 120.

More about the coaction and operation of the foregoing elements of the radio frequency portion 82, the digital portion 84 and the interface portion 86 of the satellite simulator section 80 will be explained hereinafter under the heading "Statement of the Operation."

STATEMENT OF THE OPERATION

Details of the operation, according to the digital card tester section of the present invention, are explained in conjunction with FIGS. 1 and 2. Details of the operation, according to the satellite simulator section of the present invention, are explained in conjunction with FIGS. 3 and 4.

Referring first to FIGS. 1 and 2 as viewed concurrently, the digital card select device 20 is set to a digital socket position corresponding to a digital card "i" of a plurality of digital cards "K" to be tested, and generates a predetermined digital word in response to the selection. The digital card "i" is inserted in the proper one of the digital sockets 28-1 through 28-4 of the digital card socket device 26, each digital socket being configured one-to-one for each digital system board. Then, the system reset switch 22 is depressed, as indicated by the decision block 36, thereby causing an interrupt to the microprocessor 12. The microprocessor 12 is initialized (as indicated by process blocks 38, 40 and 42, decision block 44 and process block 46) by scanning the digital card select device 20, as depicted by process block 48, to direct it to the proper memory location in the ROM 16. This memory location is read into the microprocessor 12 and then stored in the RAM 18, as indicated by the process block 52 with the validation of the correct switch settings of block 48 being accomplished as indicated by block 50. The foregoing data consist of a self-test and the program in the ROM 16 used to test the plurality of digital cards "K" from the associated navigational satellite receiver, which for purposes of the present invention is the AN/SRN-19(V)2. This data contain a test program having a test pattern and a signature response designed for the plurality of digital cards "K" under test.

To continue, simultaneously with reading the digital card select device 20, the microprocessor 12 turns off the pass indicator LED 1 via the lamp driver 30, and the fail indicator LED 2 via the lamp driver 32. Concurrently, the microprocessor 12 performs the self-test, as indicated by the process blocks 38, 40 and 42, and the decision block 44 and the process block 46. At the completion of the self-test, both the pass indicator LED 1 and the fail indicator LED 2 are turned on and off to verify proper operation. This aspect of the program is illustrated by the process block 46, aforementioned.

Still referring to FIGS. 1 and 2 as viewed concurrently, the microprocessor 12 now directs the bi-directional buffer 24 into an output mode of operation, which causes the RAM 18 to transmit the test pattern data to the selected digital card "i" via the digital card socket device 26. The testing of the digital card "i" is then performed with the microprocessor 12 controlling the bi-directional buffer 22. If during a comparison of the signature response in the RAM 18 and the output from the digital card "i" a discrepancy occurs, then an error flag is set in the microprocessor 12 (RAM 18) causing the fail indicator LED 2 to illuminate. The foregoing operation is illusrated by the process block 56 which shows setting the test pattern of the digital cards, the process block 58 which performs the test, the decision block 60 which determines whether an error is present or not, the process block 62 which increments the RAM 18 to indicate an error, the decision block 64 which tests the error flag in RAM 18, the process block 66 which decrements the error counter, the process block 68 which if there are no errors, stores the result in RAM 18, the process block 70 which sets the correct error flag, the decision block 72 which counts the number of errors, the decision block 74 which checks the error flag in RAM 18 to see if set or if it is not set and equals zero, then through process block 76 turns the pass indicator LED 1 "ON", if not set, and if there is an error flag set to "1" in RAM 18, then through process block 78, turns the fail indicator LED 2 "ON". On the other hand, if an error flag is not set during the test, then the pass indicator LED 1 is illuminated, as indicated by the process block 76. In addition, the stored information in ROM 18, as indicated by the process block 52, is displayed on the display device 34, as indicated by the process block 54. Also, displayed information as to the turning on of the pass indicator LED 1, or the fail indicator LED 2 is also displayed on the display device 34, as indicated by the process block 54. The displayed information is a digital word which gives information as to what part of the particular digital card "i" under test failed. In this way, an operator, if desired, can cross-reference to a print out and determine the actual failed component.

The test pattern and signature response are temporarily stored in the RAM 18 during the testing of the digital card "i". This information is replaced every time the digital card select device 20 and the system reset switch 22 are depressed. The signature response comparison is performed in the RAM 18 under the control of the microprocessor 12. It should be mentioned, that each of the plurality of digital cards "K" has a unique signature response which is permanently stored in the ROM 16. Accordingly, when the test for a particular digital card "i" is selected by the digital card select device 20, this information is transferred to the ROM 18 for comparison and detection of errors during the test. The system clock 14, as aforementioned, is a frequency control for the microprocessor 12, the ROM 16 and the RAM 18, and, thus, determines the test time for the testing of the plurality of digital boards "K".

The digital card tester section 10 is configured to test the four digital boards (cards) of the AN/SRN-19(V)2 radio navigational set. However, the techniques disclosed herein could be applied to the testing of any digital board having a known signature response that adequately specifies the proper operation thereof. For the foregoing purpose, the ROM 16 can be a programmable read-only memory (PROM).

Figure 4:
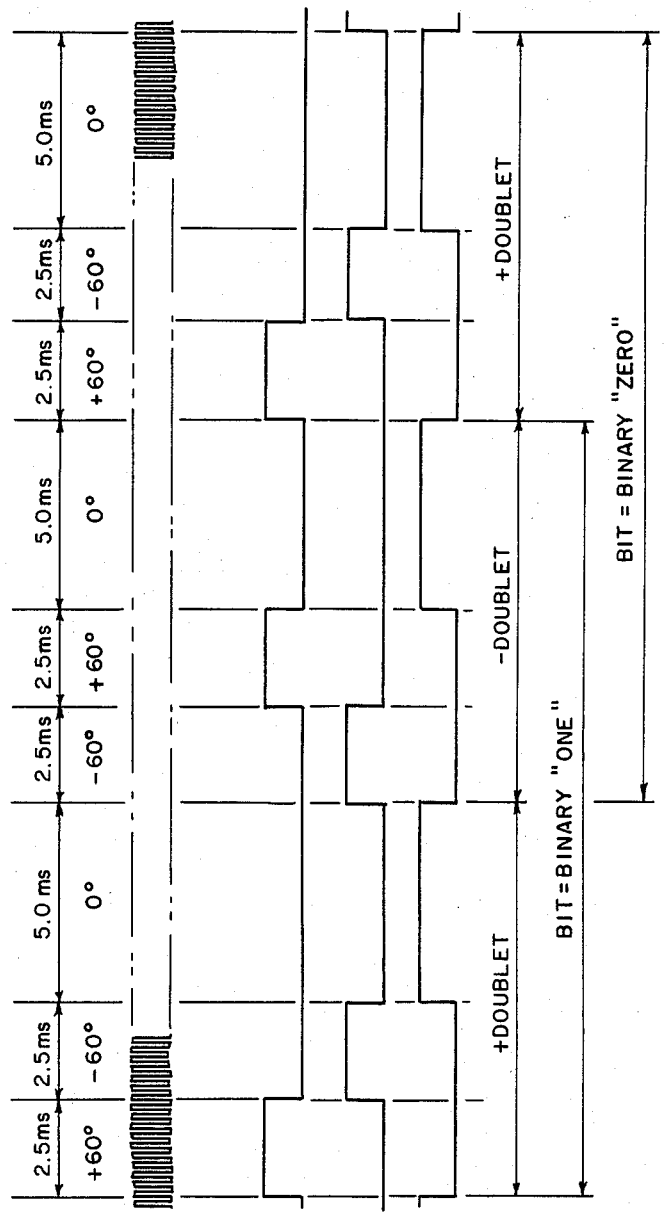
FIG. 4 is a waveform diagram illustrating the interrelationship of the radio frequency portion and the digital portion of the satellite simulator section of FIG. 3 during the operation thereof.

The operation of the satellite simulator section 80 of the test set for a navigational satellite receiver can best be understood by referring to FIGS. 3 and 4 as viewed concurrently. The satellite simulator section 80 has a mode A and a mode B operation. The mode of operation is dependent on whether the signal driving the buffer/mode select device 90 is internally derived from the crystal-controlled oscillator 88 (mode A) or externally derived from the associated navigational satellite receiver under test (mode B).

Continuing, at power turn on, and when no external signal is present at the buffer/mode select device 90, the crystal controlled oscillator 88 generates a 5 MHz–325 Hz signal. This sine wave signal is amplified and squared to a transistor-transistor logic (TTL) level in the buffer/mode select device 90. This squared signal, at the TTL level, acts as a reference input to the phase comparator/loop filter 92 whose other input is a 5 MHz signal derived from the coaction of the frequency divider 94 (divide by 20) and the voltage controlled oscillator (VCO) 96 (operating at near 100 MHz). The phase comparator/loop filter 92 is configured to phase compare the signal from the frequency divider 94 to the conditioned signal from the buffer/mode select device 90 and filter and amplify the resulting signal. This resulting or error signal is then applied to the input of the VCO 96. The foregoing elements of the radio frequency portion 82 comprise a phase-locked-loop (PLL) which operates to maintain the frequency of the VCO 96 phase coherent to the output signal of the crystal-controlled oscillator 88.

Still referring to FIGS. 3 and 4 as viewed concurrently, the output frequency of the VCO 96 is 20 times that of the crystal-controlled oscillator device 88, i.e, 100 MHz–6.5 KHz. This signal is multiplied in the frequency multiplier 100 (multiplied by 4) to a frequency of 400 MHz–26 KHz. The output of the frequency multiplier 100 drives the phase modulators 104a, 104b and 104c of the phase modulator device 102. Thus, the phase modulator device 102 has three signal paths between its input and output. These signal paths are all identical except for their electrical lengths, i.e, phase delays. The approximately 400 MHz input signal to the phase modulator device 102 is directed through one or the other of the phase modulators 104a, 104b or 104c, as controlled by the corresponding signals a, b or c on the respective modulator drive signal lines from the output control device 110 of the digital portion 84. The three modulator drive signals a, b and c are TTL level switching signals which, when at an up level, turn on their respective phase modulators 104a, 104b or 104c. The delays of the three signal paths of the phase modulators 104a, 104b and 104c are 0, 120 and 60 degrees, respectively. The 60 degree or phase modulator 104c path is, for purposes of the present invention, the reference phase of the composite signal at the output of the phase modulator device 102. The other two paths, 0° and 120 degrees, would then be ±60°, respectively, relative to the reference phase.

Referring now primarily to FIG. 4, the sequence of switching between the phase modulators 104a, 104b and 104c is such that only one of them is on at a time. The phase modulator 104a, corresponding to the 0 degree path, is on for 2.5 milliseconds (ms). Then, the phase modulator 104b, corresponding to the 120 degree path, is on for 2.5 ms, followed by the phase modulator 104c, corresponding to the 60 degree path, being on for 5.0 ms. In the satellite modulation format, this sequence of 0, 120 and 60 degrees of phase modulation upon the 400 MHz–26 kHz signal corresponds to phase modulation changes of +60, −60 and 0 degrees, respectively, which is termed a "+ doublet". As shown, a "− doublet" corresponds to phase modulation changes of −60 degrees for 2.5 ms, +60 degrees for 2.5 ms, followed by 0 degrees for 5.0 ms. Thus, a bit equivalent to a binary "one" corresponds to a "+ doublet" followed by a "− doublet". A bit equivalent to a binary "zero" corresponds to a "− doublet" followed by a "+ doublet", as shown in FIG. 4.

Referring again to FIG. 3, the sequencing of phase modulator drive signals a, b, and c, is established by the test generator 106 in cooperation with the output control device 110.

Mode B operation is the same as mode A except that an external 5 MHz signal is brought into the satellite simulator section 80 from the escutcheon panel (not shown) via the buffer/mode select device 90. When this signal is applied, three events take place. First, the buffer/mode select device 90 operates to generate a mode change command signal on the mode change command line (MCCL) to the crystal-controlled oscillator device 88 thereby cutting it off. Second, the buffer/mode select device 90 selects the input 5 MHz signal and then amplifies and squares it to the TTL level. This signal now becomes the reference signal to the input of the phase comparator/loop filter 92. Third, the count down divider 112, under control of, for example, the aforementioned mode change command line signal, an offset select switch on the escutcheon panel (not shown), generates a 26 KHz or 39 KHz signal for feeding the offset mixer 116 of the interface portion 86. This operation is necessary because the output frequency of the radio frequency portion 82 in mode B operation is eighty times the frequency of the 5 MHz reference signal. Consequently, the output of the radio frequency portion 82 will be near, or exactly at 400 MHz. However, the receiver under test, which for purposes of the present invention is the AN/SRN-19(V)2, will not respond to an exact 400 MHz test signal. Thus, by passing the signal through the offset mixer 116, in cooperation with the output from the count down divider 112, a usable signal is generated either at 400 MHz–26 KHz or 400 MHz–39 KHz, depending on the position of the offset select switch, aforementioned. In mode B operation, the mixing signal (26 KHz or 39 KHz) is derived from a count down of the 100 MHz output of the VCO 96. This count down is partially accomplished by the frequency divider 94 (divide by 20) in cooperation with the frequency divider 98 (divide by 2). In mode B operation, the phase modulation of the approximately 400 MHz signal is the same as in mode A. However, in mode B operation the frequency stability is better than in mode A, and, accordingly, suitable for measuring the doppler reconstruction circuitry (not shown) and the frequency stability of the 5 MHz reference oscillator (not shown) of the associated AN/SRN-19(V)2.

The primary purpose of the digital portion 84 of the satellite simulator 80 of FIG. 3 is to generate the sequence of digital data (signals a, b and c) for driving the phase modulator device 102. The digital data are similar to that from a system satellite in terms of having a repeating message data pattern, as generated by the test message generator 106, and a two minute synchronization data pattern, as generated by the sync word generator 108. The test message generator 106 is configured to generate a signal (message data) corresponding to a repeating sequence of two binary "ones" followed by two binary "zeros". The test message generator 106 continually outputs this repeating pattern via the output control device 110 as the drive signals a, b and c. The drive signal for the test message generator 106 and the count down divider 112 is a 2.5 MHz signal from the output of the frequency divider 98 of the RF portion 82. As also controlled from the escutcheon panel (not shown), the sync word generator 108 is configured to generate a sync word consisting of 25 binary bits, i.e, a "zero", 23 "ones" and another "zero" in that order. Since each binary bit, "one" or "zero" requires 20.0 ms as, shown in FIG. 4, a sync word requires 0.5 seconds. After a sync word is completed, the output control device 110 in cooperation with the test message generator 106 automatically recommences the repeating message data sequence from the test message generator 106, as previously described.

The interface portion 82 serves to interface the test signal, at three different predetermined power levels, to the associated navigational satellite receiver under test via the output of the tri-level attenuator 120 (direct connection), or via the other output of the RF switch 188 (indirect connection) to a radiating antenna (not shown). The afore-mentioned two units are controlled by the direct/indirect test control device 114, which acts to switch between direct testing or indirect testing, of the associated navigational satellite receiver.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. A digital card tester section of a test set for detecting the reduced capabilities of an associated navigational satellite receiver, said digital card tester section being configured to generate signals (signatures) for testing and isolating faults in a predetermined number of digital system cards of the associated navigational satellite receiver according to a predetermined program, said digital tester card section comprising:

a read-only memory (ROM) being configured to store the predetermined program which corresponds to at least the signatures of the predetermined numbers of digital system cards under test;

a random access memory (RAM) being configured to permit data, in the form of the signatures, and in the form of responses, from the predetermined number of digital cards under test to be stored or retrieved at comparable intervals according to predetermined periodic signals;

a system clock for generating the predetermined periodic signals for proper synchronization of signatures, responsive signals, and timing signals;

a microprocessor operatively connected to said ROM, to said RAM and to said system clock for decoding and executing the predetermined program stored in said ROM;

connection means for operatively connecting the predetermined number of digital system cards under test to said microprocessor and said RAM;

intialization means operatively connected to said microprocessor for instituting initialization thereof, and of said ROM and said RAM; and display means operatively connected to said microprocessor for displaying the output of the RAM for the predetermined number of digital system cards, and for indicating the faults therein.

2. The digital card tester section of claim 1 wherein said connection means comprises:

a digital card socket device configured to support and electrically connect the predetermined number of digital system cards when inserted therein; and a bi-directional buffer operatively connected between said digital card socket device, said RAM and said microprocessor for transferring data under the control of said microprocessor, to and from said digital card socket device and to and from said RAM.

3. The digital card tester section of claim 2 wherein said digital card socket device of said connection means includes a predetermined number of digital card sockets corresponding to the predetermined number of digital system cards, each socket being configured one-to-one for each digital system board.

4. The digital card tester section of claim 3 wherein said initialization means comprises:

a digital card select device operatively connected to said microprocessor and being configured to be set to a digital socket position corresponding to one of the predetermined number of digital card sockets so as to generate a digital word in response thereto; and a system reset switch operatively connected to said microprocessor and being configured to generate an interrupt thereto, after the particular digital system card to be tested is inserted in the proper one of the predetermined number of digital card sockets, so as to commence the initialization process.

5. The digital card tester section of claim 4 wherein said display means comprises:

a pass indicator operatively connected to said microprocessor for indicating a passed condition for the one of the predetermined number of digital system boards under test;

a fail indicator operatively connected to said microprocessor for indicating a failed condition for the one of the predetermined number of digital system boards under test; and a display device operatively connected to said pass indicator and to said failed indicator, via said microprocessor, for displaying information, in the form of a digital word, as to whether the one of the predetermined number of digital system boards under test passed or failed, and if failed, what part thereof failed.

6. The digital card tester section of claim 5 wherein said pass indicator comprises:
a green light-emitting diode (LED); and
a lamp driver operatively connected between said green LED and said microprocessor such that, under control of said microprocessor, said green LED is illuminated if an error flag is not set in said RAM when the predetermined signature of the one of the predetermined number of digital system boards under test is compared with the response therefrom.

7. The digital card tester section of claim 6 wherein said fail indicator comprises:
a red light-emitting diode (LED); and
another lamp driver operatively connected between said red LED and said microprocessor such that under control of said microprocessor, said red LED is illuminated if an error flag is set in said RAM corresponding to a discrepancy when the predetermined signature of the one of the predetermined number of digital system boards under test is compared with the output response therefrom.

8. The digital card tester section of claim 7 wherein the predetermined program stored in said ROM includes a self-test routine.

9. The digital card tester section of claim 8 wherein said ROM comprises a programmable read-only memory (PROM) for changing the signature data therein to correspond to other than the predetermined number of digital system cards, if desired.

* * * * *